United States Patent [19]

Roehrman

[11] 3,955,061

[45] May 4, 1976

[54] HIGH FREQUENCY POWER DISTRIBUTION AND CONTROL SYSTEM

[75] Inventor: Kenneth E. Roehrman, Litchfield Park, Ariz.

[73] Assignee: Motorola, Inc., Chicago, Ill.

[22] Filed: Aug. 5, 1974

[21] Appl. No.: 494,788

[52] U.S. Cl. .................... 219/10.77; 235/151.21; 307/41
[51] Int. Cl.² .................... H05B 5/04; H02J 3/14
[58] Field of Search ............... 219/10.77, 10.75; 235/151.21; 307/41, 52, 57, 11, 29, 38

[56] References Cited
UNITED STATES PATENTS

| 3,435,172 | 3/1969 | Emerson | 219/10.75 |
| 3,769,520 | 10/1973 | Carrington | 307/41 |
| 3,787,729 | 1/1974 | Bennett | 307/41 |
| 3,789,201 | 1/1974 | Carpenter et al. | 235/151.21 |

*Primary Examiner*—Bruce A. Reynolds
*Attorney, Agent, or Firm*—Harry M. Weiss; Kenneth R. Stevens

[57] ABSTRACT

This disclosure describes power distribution with the use of semiconductor switches. A digital differential analyzer (DDA) selectively switches integer cycles of a generator into a load demand determined by analog sensing located at the work station associated with the load.

9 Claims, 4 Drawing Figures

HIGH FREQUENCY POWER DISTRIBUTION AND CONTROL SYSTEM

BACKGROUND OF THE INVENTION

1. Field of Invention

This invention relates to power distribution systems and more particularly to power distribution by means of solid state devices.

2. Description of the Prior Art

In many power distribution applications it has been necessary to employ a large number of smaller generating machines due to the unique power requirements of a number of differing loads. For example, in industrial induction heating equipment, it is not uncommon to find a great number of small machines dedicated to handle a number of respective dissimilar loads. This type of approach is extremely inefficient from two major standpoints. Significantly in the case of induction heating, close control of the power to any given load is difficult or expensive in requiring sophisticated control equipment for each generator load pair. Secondly, the multiple generator approach often prohibits maximum operational efficiency due to the intermittent demand cycle associated with a single load and the inability of all the generators to run at rated line voltage.

SUMMARY OF THE INVENTION

It is therefore an object of the invention to provide a power distribution control system which is capable of switching power into a plurality of dissimilar loads at faster speeds and with a higher degree of preciseness.

Another object of the present invention is to provide a power distribution system which can supply a plurality of dissimilar loads from a single generating source in a multiplex mode while maintaining excellent power control to any individual load.

Another object of the present invention is to provide a power control and distribution system which is advantageously implementable with high frequency semiconductor switching devices, this eliminates any form of mechanical contactors and electromechanical timers.

Another object of the present invention is to provide a power distribution control system capable of switching 100% of the line voltage at a selectable duty cycle.

In accordance with the aforementioned objects, the present invention provides a power distribution and control system wherein a plurality of loads are serially capable of receiving power on a time-sharing basis from a single generator. Semiconductor switching means are capable of selectively switching a particular load into the generator circuit. More efficient and faster control of power distribution is obtained by switching the generator voltage at even integer cycles, i.e., 0°, 180°, 360°, etc. Connecting the loads to the generator at integer cycles is accomplished by pulse modulation switching of the semiconductor devices.

DESCRIPTION OF THE PREFERRED EMBODIMENTS

Figure 1:
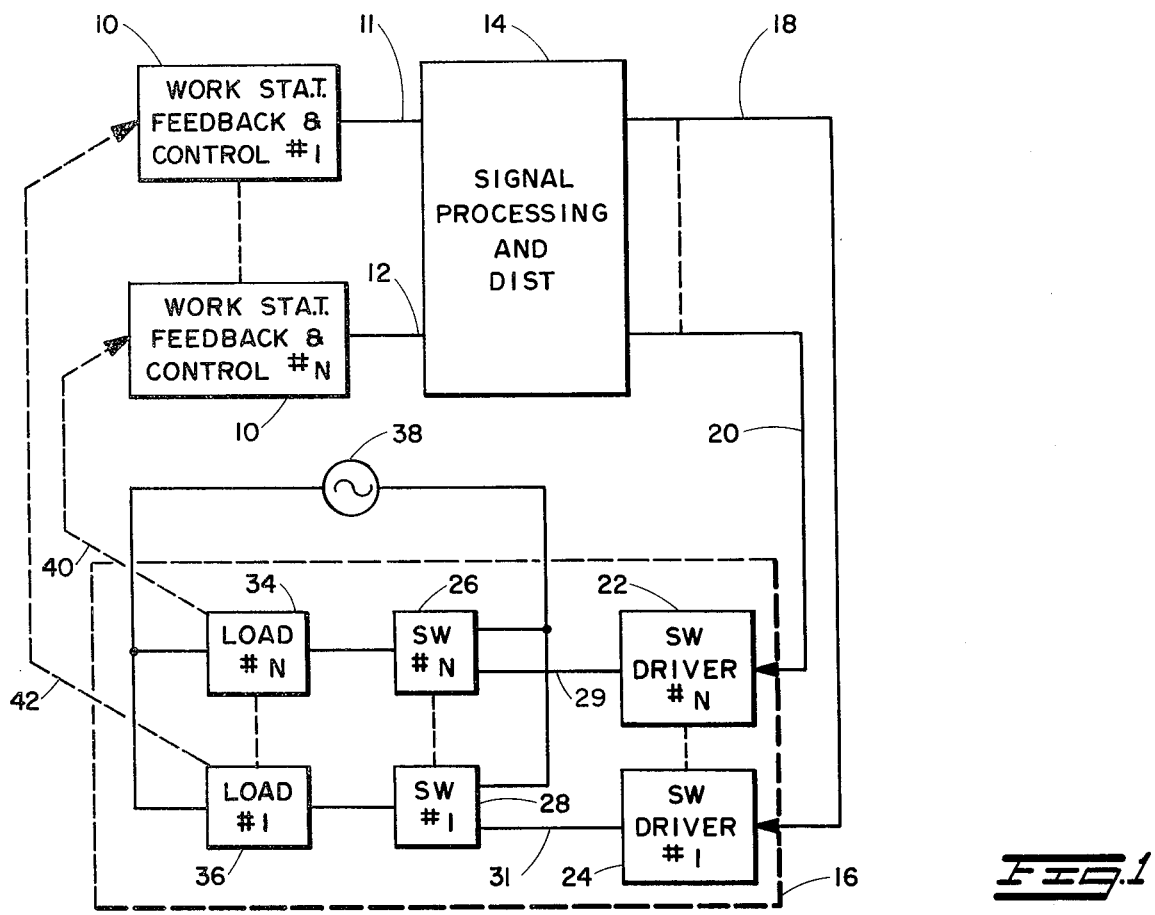
FIG. 1 shows a block diagram of the overall power distribution and control system.

Now referring to FIG. 1, it illustrates the overall system block diagram and includes a plurality of Work Station Feedback and Control Units 10. With respect to the units 10 and other units and circuits hereinafter described, their numbers are shown as 1...N to indicate that the system can be readily expanded and the exact number is a matter of choice and design. Each of the units 10 contains an analog trasducer (not shown) for sensing an analog signal representation at that particular unit and transmitting it to a Signal Processing and Distribution Unit 14 via lines 11 and 12. The unit 14 generates a pulse modulated signal and applies it to the load output section 16 by means of output lines 18 and 20.

Each branch of the output load section includes an associated switch driver 22 and 24 connected to its respective semiconductor switch 26 and 28 by means of lines 29 and 31. The plurality of loads shown at 34 and 36 can be each selectively connected to a generator source generally shown at 38 by means of its respective semiconductor switch 26 or 28. Dashed lines 40 and 42 from the loads 34 and 36 schematically illustrate the feedback control line for providing an analog error signal at its respective Work Station Feedback and Control Unit 10 indicative of the difference between the actual power being supplied to the load and the amount required.

Figure 2:
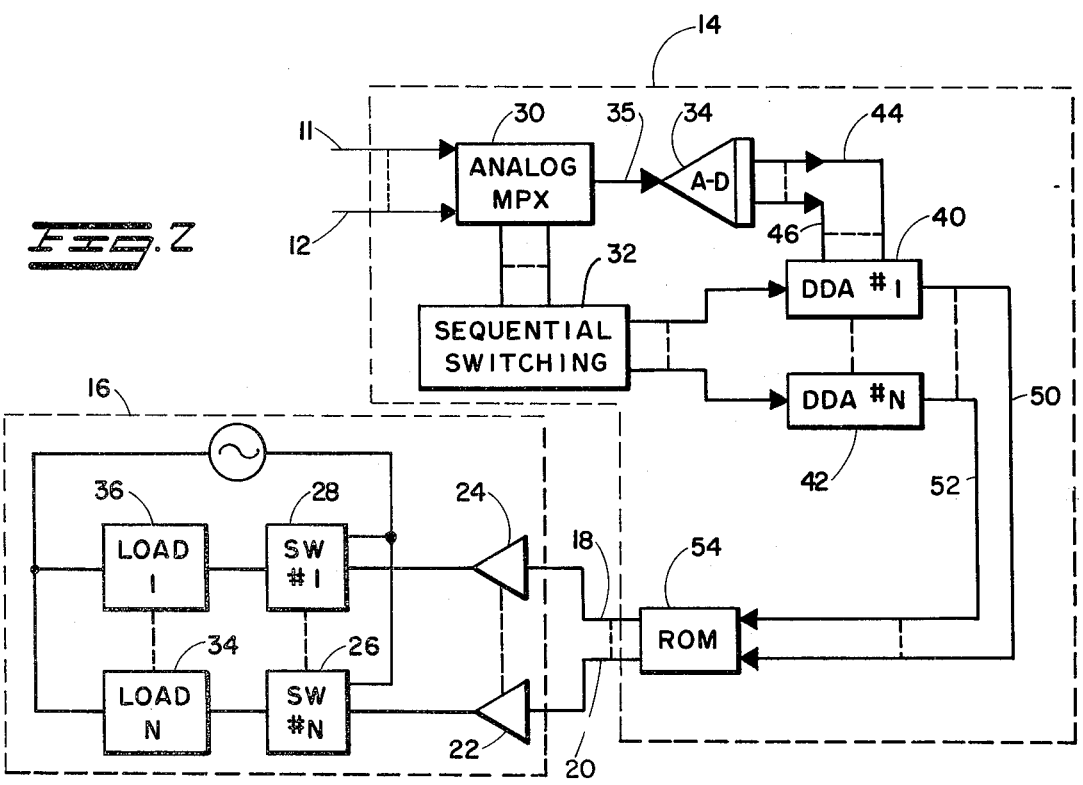
FIG. 2 shows a more detailed block diagram of the Signal Processing and Distribution Unit generally shown in FIG. 1.

Now referring to FIG. 2, it illustrates in greater detail the components of the Signal Processing and Distribution Unit 14. The unit 14 comprises an analog multiplexing section 30 which in conjunction with the sequential switching unit 32 is capable of selectively monitoring one of the units 10 in order to receive an analog signal on one of the lines generally designated at 11 or 12. This signal is then fed to an analog-to-digital converter 34 connected to the analog multiplexer unit 30 by means of 35. In this embodiment, the analog signal received by the analog-to-digital converter 34 is converted to a digital representation and applied to an appropriate digital differential analyzer DDA 40 or 42 by means of the plurality of output lines shown at 44 and 46. It is realized that a plurality of digital differential analyzers are employed in this preferred embodiment. However, it is to be understood that the actual number is a design consideration which is dictated by the overall system specification power and speed requirements. Finally, the DDA units 40 and 42 provide a pulse modulated output signal on output lines 50 and 52 which are connected to control read only memory (ROM) device 54. The ROM 54 is connected by the lines 18 and 20 to the load output section 16 previously described in connection with FIG. 1, and wherein like reference numerals are employed to indicate identical elements.

Figure 3:
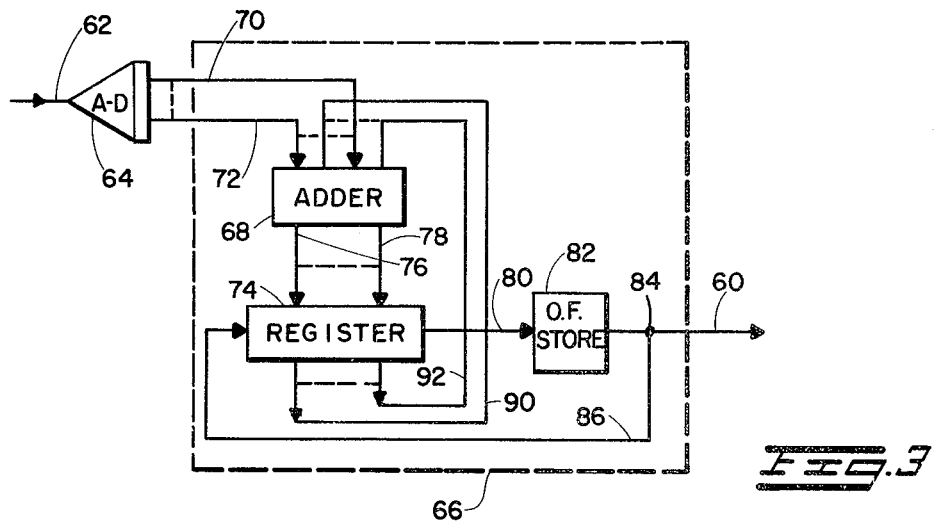
FIG. 3 shows a more detailed block diagram of the Digital Differential Analyzer, DDA, generally shown in FIG. 2.

Now referring to FIG. 2 and FIG. 3, it illustrates the details of a suitable DDA generally depicted in FIG. 2 for providing or generating a pulse modulated output signal on line 60 in response to an analog signal received on input line 62 connected to an analog-to-digital converter 64. The DDA 66 of the FIG. 3 embodiment comprises an adder stage 68 connected to the analog-to-digital converter by means of lines 70 and 72. Again, the drawings illustrate a power control and distribution system which is capable of handling N loads and therefore each of the drawings is universalitized in order to illustrate this capability. The adder 68 is connected to a register 74 by means of lines 76 and 78. One output of the register is connected by line 82 to an O.F. (overflow) Store unit 82. The output from unit 82 is connected at node 84 to the output line 60 and to one of the inputs of register 74 by means of line 86. Output signals from the register 74 are also fed back to the adder stage 68 by means of lines 90 and 92.

Figure 4:
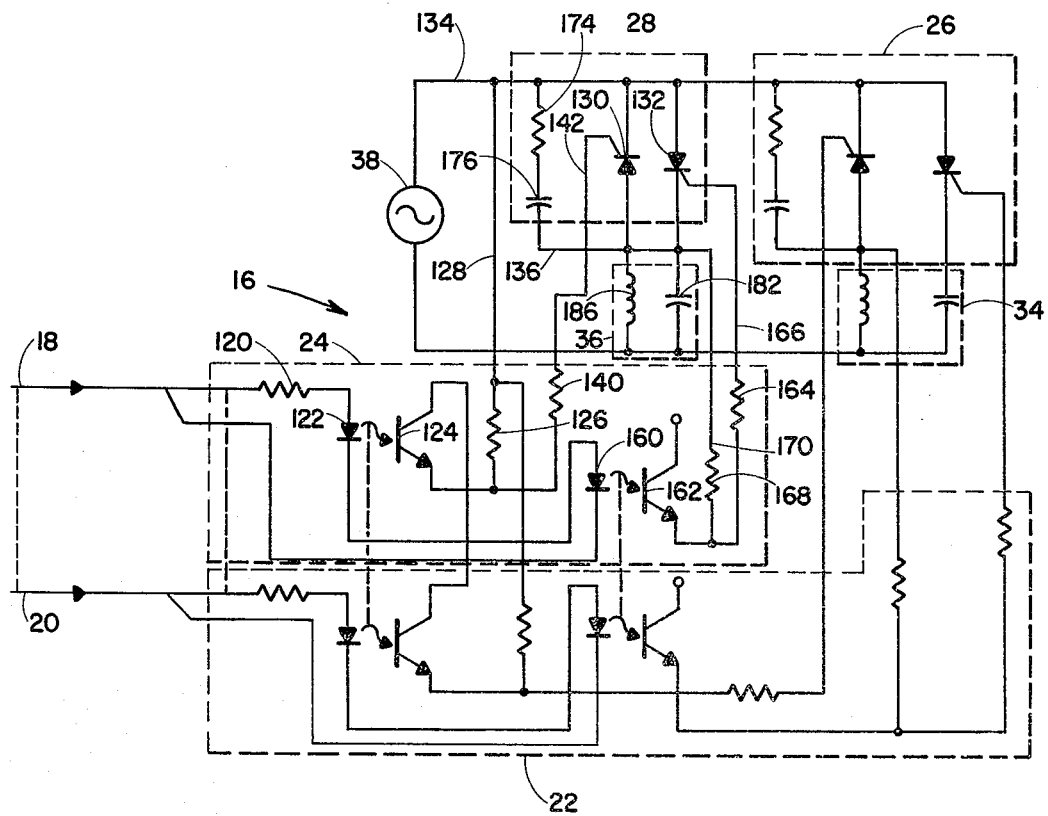
FIG. 4 shows a detailed schematic of the load output section shown generally in FIGS. 1 and 2.

Now referring to FIG. 4, it illustrates a detailed schematic of the load output section 16 generally depicted in FIGS. 1 and 2. The pulse modulated signals from the Signal Processing and Distribution Unit 14 are received by unit 16 at input lines 18 and 20, as previously described, and further includes switch drivers 24 and 22 connected to semiconductor switches 28 and 26, respectively. Each of the semiconductor switches 28 and 26 is in turn connected to its respective loads 36 and 34 which are in turn connected across generator source 38. Again, like reference numerals have been employed for like elements previously discussed. As the switch drivers, switches and loads are depicted as identical elements only one of each will be specifically described for purposes of clarity and ease of description.

Now referring to switch driver 24 which receives a pulse modulated signal on line 18 which in turn is connected to resistor 120. The resistor 120 connects to a photon diode transistor isolation constituted by diode 122 and NPN transistor 124. One side of switch 28 is connected to the emitter of transistor 124 by way of resistor 126 and 128. Also, the switch 28 constituted by a pair of high current silicon controlled rectifiers 130 and 132 are connected in inverse parallel across lines 134 and 136. The gate terminal of silicon controlled rectifier 130 is also connected to the emitter of transistor 124 by means of resistor 140 and line 142. Similarly, silicon controlled rectifier 132 has its gate terminal connected to another photon isolator circuit constituted by diode 160 and NPN transistor 162 by means of resistor 164 and line 166. The emitter of transistor 162 is connected to line 136 by resistor 168 and line 170. A stabilizing circuit constituted by resistor 174 and capacitor 176 is connected across the silicon controlled rectifiers 130 and 132.

The load 36 is represented as a reactive load constituted by inductor 180 and capacitor 182. The collector of transistor 162 is connected to an appropriate positive voltage source (not shown).

Thus, the photon isolation circuits within the switch driver 24 are capable of electrically connecting the signal received on line 18 to the semiconductor switch 28, but yet provide the necessary isolation in order to eliminate the requirement of pulse transformers capable of driving heavy currents over a 90° phase angle.

The two high current silicon controlled rectifiers 130 and 132 are designed for high frequency operation and are rated at 150 amperes, 1000 volts at 10KHz. The switch 28 is capable of controlling currents up to 30 KW loads. The photon isolation circuits of the switch driver circuit 24 and the high frequency silicon controlled rectifiers forming a part of the switch 28 are commercially available items, for example, Motorola Part Nos. MOC1000 and MCR380, respectively.

OPERATION OF THE INVENTION

Operatively, the power controlled and distribution system of the present invention is capable of switching power to the loads on integer cycles. The DDA 66 provides a pulse modulated signal in response to the analog signal presented to the analog-to-digital converter 64. Using successive addition, adder 68 receives the digital representations from the A-D converter and stores them in register 74 and continuously feeds back the result to the input of the adder 68 via lines 90 and 92. During the successive addition, the overflow from register 74 is delivered to the O.F. Store unit 82 by means of line 80. The outputs from the O.F. Store 82 comprise a pulse modulated signal which is applied to the ROM device 54 via line 60.

The ROM device 54 in its preferred embodiment is used to logically determine the priority of switching the generator into a plurality of separate load demands. Thus, the priority of the load is strictly a function of the ROM design.

For example, based on the given situation of the generator 38 being capable of driving a specified number $r$ or $n$ loads, the number of combinations $c$ becomes: $c = n!/ r!(n-r)!$ Table I illustrates the alternatives available for a generator capable of driving any two loads from a population of four. Since the priority has to be set on only those situations having more than two one's present, the choice is not so involved. The priority is of course $a\ b\ c\ d$ and all other combinations are programmed one for one.

TABLE I

| DDA Demand | ROM Selection |
|---|---|
| a b c d | a b c d |
| 0 1 1 1 | 0 1 1 0 |
| 1 0 1 1 | 1 0 1 0 |
| 1 1 0 1 | 1 1 0 0 |
| 1 1 1 0 | 1 1 0 0 |
| 1 1 1 1 | 1 1 0 0 |

Assuming the capacity of the register 74 to the one-hundred, Table II illustrates operation of the circuit. The end around carry provides for long term output pulses to be added back in, thus insuring continuity of the output.

TABLE II

| Input | 25% Register | Output |
|---|---|---|
| 25 | 0 | 0 |
| 25 | 25 | 0 |
| 25 | 50 | 0 |
| 25 | 75 | 0 |
| 25 | 0 | 1 |
| 25 | 25 | 0 |
| 25 | 50 | 0 |
| 25 | 75 | 0 |
| 25 | 0 | 1 |

| Input | 50% Register | Output |
|---|---|---|
| 50 | 0 | 0 |
| 50 | 50 | 0 |
| 50 | 0 | 1 |
| 50 | 50 | 0 |
| 50 | 0 | 1 |
| 50 | 50 | 0 |
| 50 | 0 | 1 |
| 50 | 50 | 0 |
| 50 | 1 | 1 |

Because of the relative time involved, a clock frequency one-tenth of the line frequency or 1KHz is used in the preferred embodiment. The smallest increment of power is then ten cycles of 10KHz. Because of the fact that switching is done only at zero voltage, switching noise is virtually eliminated. When power factor considerations are taken into account, turn-off presents the worst case situation because storage time of the device plus ninety degress lead or lag must equal less than one half cycle of the line.

Accordingly, the present invention provides precise power distribution and control and has been successfully implemented on a time-sharing system of two loads from a 30KW, 220V, 10KHz, generator for induction heating.

What is claimed is:

1. A power distribution system for asynchronously supplying power from a generator operating at a frequency substantially higher than 60 cycles per second to a plurality of connected loads on a time-sharing basis comprising:
   a. first means for providing a digital signal indicative of the power demand into a particular load,
   b. second means connected to said first means for providing a pulse modulated signal,
   c. third means connected to said second means for selecting one of said plurality of loads,
   d. semiconductor switching means connected to said third means and the generator and responsive to said pulse modulated signal for connecting the generator to one of said loads at an exact integer cycle, i.e., 0°, 180°, 360°.

2. A power distribution system for asynchronously supplying power from a generator to a plurality of connected loads on a time-sharing basis, as in claim 1, further including:
   a. fourth means for providing an analog error signal indicative of the power demand of said plurality of loads, and
   b. said first means comprising an analog-to-digital converter means connected to said fourth means for providing said digital signal.

3. A power distribution system for asynchronously supplying power from a generator to a plurality of connected loads on a time-sharing basis as in claim 2 further including:
   a. analog multiplexing means coupled to receive said analog error signal for selectively connecting an analog error signal indicative of a power demand from a single load to said analog-to-digital converter means.

4. A power distribution system for asynchronously supplying power from a generator to a plurality of connected loads on a time-sharing basis as in claim 3 wherein:
   a. said second means comprises a digital differential analyzer means.

5. A power distribution system for asynchronously supplying power from a generator to a plurality of connected loads on a time-sharing basis as in claim 4 wherein:
   a. said third means comprises a read only memory.

6. A power distribution system for asynchronously supplying power from a generator to a plurality of connected loads on a time-sharing basis as in claim 5 further including:
   a. opto-electrical isolation means for connecting said read only memory to said semiconductor switching means.

7. A power distribution system for asynchronously supplying power from a generator to a plurality of connected loads on a time-sharing basis as in claim 3 wherein:
   a. said plurality of loads are constituted by induction heating means.

8. A power distribution system for asynchronously supplying power from a generator to a plurality of connected loads on a time-sharing basis as in claim 7 wherein:
   a. said semiconductor switching means comprise a plurality of silicon controlled rectifiers.

9. A power distribution system for asynchronously supplying power from a generator to a plurality of connected loads on a time-sharing basis as in claim 8 wherein:
   a. the generator is operative at full rated line voltage.

* * * * *